(12) United States Patent
Plakas et al.

(10) Patent No.: US 8,837,791 B2
(45) Date of Patent: Sep. 16, 2014

(54) FEATURE LOCATION METHOD AND SYSTEM

(75) Inventors: Costas Plakas, Edinburgh (GB); Ian Poole, Edinburgh (GB)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 668 days.

(21) Appl. No.: 12/976,725

(22) Filed: Dec. 22, 2010

(65) Prior Publication Data

US 2012/0163687 A1 Jun. 28, 2012

(51) Int. Cl.
*G06K 9/00* (2006.01)
*G06T 7/00* (2006.01)

(52) U.S. Cl.
CPC .......... *G06T 7/0038* (2013.01); *G06K 2209/05* (2013.01); *G06T 2207/30004* (2013.01); *G06T 7/0044* (2013.01); *G06T 2207/10081* (2013.01)
USPC ................................ 382/128; 382/209; 378/1

(58) Field of Classification Search
CPC ...................... A61B 2019/5483; A61B 5/1128; A61B 5/0013; A61B 2019/5265; A61B 5/064; A61B 19/54; A61B 2019/524; A61B 2019/5287; A61B 8/13; A61B 8/483; G06T 2207/20101; G06T 2207/10072; G06T 2207/30204; G06T 7/0081; G06K 2209/05; G06K 9/00288; G06K 9/00342
See application file for complete search history.

(56) References Cited

U.S. PATENT DOCUMENTS 5,905,814 A * 5/1999 Mochizuki et al. ............ 382/239
6,009,212 A * 12/1999 Miller et al. .................. 382/294

(Continued)

FOREIGN PATENT DOCUMENTS

| CN | 1235684 A | 11/1999 |
|---|---|---|
| EP | 1 657 681 A1 | 5/2006 |
| WO | WO 2008/014082 A2 | 1/2008 |

OTHER PUBLICATIONS

B. Haas, et al., "Automatic segmentation of thoracic and pelvic CT images for radiotherapy planning using implicit anatomic knowledge and organ-specific segmentation strategies", Phys. Med. Biol., vol. 53, 2008, pp. 1751-1771.

(Continued)

*Primary Examiner* — Manav Seth
(74) *Attorney, Agent, or Firm* — Oblon, Spivak, McClelland, Maier & Neustadt, L.L.P.

(57) ABSTRACT

A method of locating anatomical features in a medical imaging dataset comprises obtaining a medical imaging measurement dataset that comprises image data for a subject body as a function of position; and performing a registration procedure that comprises:—providing a mapping between positions in the measurement dataset and positions in a reference dataset, wherein the reference dataset comprises reference image data for a reference body as a function of position, the reference dataset comprises at least one anatomical landmark, and the or each anatomical landmark is indicative of the position of a respective anatomical feature of the reference body; matching image data in the measurement dataset with image data for corresponding positions in the reference dataset, wherein the corresponding positions are determined according to the mapping; determining a measure of the match between the image data of the measurement dataset and the image data of the reference dataset; varying the mapping to improve the match between the image data of the measurement dataset and the image data of the reference dataset, thereby to obtain a registration mapping; and using the registration mapping to map the positions of the anatomical landmarks to positions in the measurement dataset, thereby to assign positions to anatomical features in the measurement dataset.

38 Claims, 5 Drawing Sheets

(56) References Cited

U.S. PATENT DOCUMENTS

| | | | |
|---|---|---|---|
| 6,273,896 B1* | 8/2001 | Franck et al. | 606/130 |
| 7,394,946 B2* | 7/2008 | Dewaele | 382/276 |
| 7,639,895 B2* | 12/2009 | Sakas et al. | 382/284 |
| 7,948,503 B2* | 5/2011 | Shekhar et al. | 345/648 |
| 8,384,552 B2* | 2/2013 | Pauly et al. | 340/600 |
| 2005/0025365 A1 | 2/2005 | Oosawa | |
| 2006/0228012 A1* | 10/2006 | Masuzawa | 382/131 |
| 2007/0127790 A1 | 6/2007 | Lau et al. | |
| 2008/0267471 A1 | 10/2008 | Yu et al. | |
| 2011/0028825 A1* | 2/2011 | Douglas et al. | 600/407 |

OTHER PUBLICATIONS

Keigo Nakamura, et al., "A machine learning approach for body part recognition based on CT images", Proc. of SPIE, vol. 6914, 2008, 9 pages.

X. Zhou, et al., "Preliminary Study for Automated Recognition of Anatomical Structure from Torso CT images", Proc. of the 2005 IEEE, Engineering in Medicine and Biology $27^{th}$ Annual Conference, 2005, pp. 650-653.

Xiangrong Zhou, et al., "Automatic recognition of lung lobes and fissures from multi-slice CT images", Proc. of SPIE, vol. 5370, 2004, pp. 1629-1633.

Xiangrong Zhou, et al., "Automated Recognition of Human Structure From Torso CT Images", Proceedings of the Fourth IASTED International Conference, Visualization, Imaging, and Image Processing, Sep. 6-8, 2004, pp. 584-589.

Combined Chinese Office Action and Search Report issued Dec. 13, 2013, in Chinese Patent Application No. 201110430516.6 with English translation.

* cited by examiner

FEATURE LOCATION METHOD AND SYSTEM

FIELD

Embodiments described herein relate generally to the automatic identification of anatomical features within a medical imaging dataset, for example a volumetric medical imaging dataset such as a computerised tomography (CT) dataset. Embodiments relate, for example, to the automatic identification of the starting position and extent of particular anatomical regions within a medical imaging dataset.

BACKGROUND

Modern three-dimensional imaging techniques, such as computerised tomography (CT), have the ability to produce volumetric representations of anatomy allowing users to examine acquired data retrospectively or under live screening from any plane and apply image processing techniques to achieve accurate viewing of individual structures.

Such three-dimensional techniques produce large three-dimensional volume datasets comprising a three-dimensional array of voxels each representing a property of a corresponding measurement volume. In the case of CT datasets, each voxel usually represents the attenuation of X-ray radiation by a respective, corresponding measurement volume.

It can be desired to identify particular anatomical regions or features from a volumetric dataset for a variety of different purposes.

For example, very large quantities of CT datasets or other volumetric imaging datasets are already in existence, for instance stored in patient or hospital databases. Usually data is stored together with metadata such as patient or measurement data. The patient or measurement data may identify the patient on whom the measurement was performed, may represent at least some of the measurement parameters, and may identify the region of the patient on which the measurement was performed. In some cases label data is stored with an imaging dataset, that labels particular features of the image represented by the dataset. However, the amount and quality of patient or measurement data, or other metadata, that is stored with each imaging dataset can vary widely. It can be difficult to determine what a particular imaging dataset represents, without skilled input from a radiologist or other medical personnel. It can also be difficult, or impossible, to effectively automatically search medical imaging databases for datasets representative of images of particular anatomical features, given the usual metadata that is provided with such datasets.

Another area in which it can be important to identify anatomical regions of an image relates to the use of scout images in CT imaging or other imaging modalities. When performing CT imaging, an initial set of imaging measurements is performed on a patient, often from a single angle or set of angles. The measurements usually comprise X-ray projection measurements on the patient at a fixed angular position of the X-ray source. Such initial measurements are often of relatively low power or resolution. The initial measurements are referred to as scout image measurements, and the resulting image can be referred to as a scout image and is similar to a convention X-ray image. The term scanogram can also be used to refer to the scout image. An operator typically examines the scout image to identify the position of a patient relative to the imaging apparatus, and identify the approximate position of particular anatomical features or regions. The operator then uses that information to set up the imaging apparatus for subsequent more accurate or higher dosage measurements of particular anatomical regions. Examination of the scout image by the operator is usually required to identify anatomical regions and no automatic procedure is provided. If the operator makes a mistake in examining the scout image then incorrect anatomical regions of the patient may subsequently be exposed to radiation.

In other examples, it is commonly desired to identify anatomical regions to enable subsequent analysis, or viewing, of data representative of particular anatomical features. A range of techniques has been developed to locate and identify particular anatomical features or regions or to automatically select particular parts of a medical imaging dataset for imaging or analysis.

Some known techniques locate anatomical regions or features using tissue and organ segmentation. In such techniques a thresholding and region growing approach is used to segment image data representative of the torso and separate it into various tissues, such as skin, subcutaneous fat, visceral fat, muscle, organs, skeleton, diaphragm and thoracic and abdominal cavities. According to such approaches each voxel is identified as representing for example, air, fat, muscle or organ, or skeleton based upon comparison of the Houndsfield Unit (HU) value for that voxel. The different types of voxels are then used in region growing procedures and different anatomical features are identified based upon the distribution of the different types of voxels.

In an alternative technique, body outline, bone equivalent and lung equivalent regions are detected by thresholding and connected component labelling. A crude anatomic region classification into thorax, pelvis or unknown is then performed based on analysis of the bone and lung segments in each slice of data. Patient position (supine, prone, or unknown) is also determined. Next, slices containing anatomic points are identified using any of a variety of different techniques chosen as suitable for the anatomic point of interest. Finally, based on interpolation within the map implied by the anatomic points, the pelvic and thoracic regions are further subdivided into their constituent regions and organs.

In another technique, anatomical features are located using axial slice classification based on machine learning techniques. Firstly, axial CT slices are rotated to a normalized state. Secondly, each slice is classified into one of a number of different classes (for example based on a set of features of the image data of each slice. Thirdly, dynamic programming is used to resolve inconsistencies in the ordering of the slice classes.

A further known technique is based on the analysis of a thresholded 2D projection of a skeleton. Horizontal lines through the binary 2D image are clustered based on the width of the interval defined by the most distal above-threshold points, and the proportion of above-threshold points lying within that interval. Clustered regions (contiguous sets of horizontal lines belonging to the same cluster) are then classified using a trained classifier into different skeletal regions.

The known automatic or semi-automatic techniques mentioned above for identifying anatomical regions or features are generally computationally costly and involve complex processing pipelines and algorithms. The techniques generally have some other aim, for example the detailed analysis of a particular anatomical feature, and the detection or estimation of anatomical regions is usually obtained as a by-product of that other aim. The known techniques mentioned above are not generally well suited to the rapid and computationally efficient determination of anatomical regions of three dimensional imaging datasets.

In the case of the other applications mentioned above for which identification of anatomical regions can be useful, such identification is usually performed manually by an operator, for example by an examination of a scout image or examination of stored images in a database.

BRIEF DESCRIPTION OF THE DRAWINGS

Embodiments are now described, by way of non-limiting example, and are illustrated in the following figures, in which:—

DETAILED DESCRIPTION

According to one embodiment, a method of locating anatomical features in a medical imaging dataset comprises obtaining a medical imaging measurement dataset that comprises image data for a subject body as a function of position, and performing a registration procedure. The registration procedure may comprise providing a mapping between positions in the measurement dataset and positions in a reference dataset, wherein the reference dataset comprises reference image data for a reference body as a function of position, the reference dataset comprises at least one anatomical landmark, and the or each anatomical landmark is indicative of the position of a respective anatomical feature of the reference body. The method may comprise matching image data in the measurement dataset with image data for corresponding positions in the reference dataset, wherein the corresponding positions are determined according to the mapping, determining a measure of the match between the image data of the measurement dataset and the image data of the reference dataset; varying the mapping to improve the match between the image data of the measurement dataset and the image data of the reference dataset, thereby to obtain a registration mapping, and using the registration mapping to map the positions of the anatomical landmarks to positions in the measurement dataset, thereby to assign positions to anatomical features in the measurement dataset.

Figure 1:
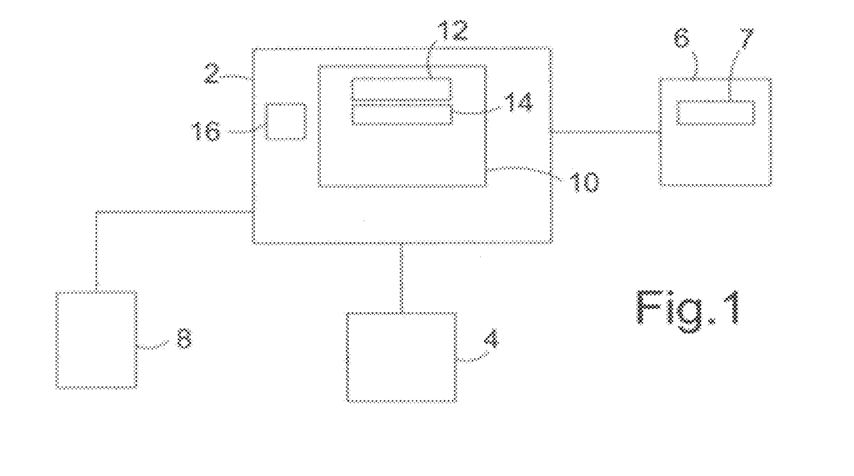
FIG. 1 is a schematic diagram showing an image processing apparatus according to an embodiment.

An image processing apparatus according to an embodiment is illustrated schematically in FIG. 1. The apparatus comprises a processing apparatus 2, in this case a personal computer (PC) or workstation that is connected to a display device 4, a data store 6 and a user input device or devices 8, in this case a computer keyboard and mouse.

The processing apparatus 2 comprises a central processing unit (CPU) 10 that is operable to load and execute a variety of software modules or other software components. In the embodiment of FIG. 1, the software modules include a pre-processing and projection module 12 for pre-processing and performing projections on volumetric image data. The software modules also include a registration module 14 for performing a registration process for matching image data to an atlas so as to assign positions to anatomical features in the measurement image data, as described in more detail below.

The processing apparatus also includes a hard drive 16. In the embodiment of FIG. 1 the hard drive 16 stores the atlas that is used in the registration process.

The processing apparatus 2 includes other standard components of a PC including RAM, ROM, a data bus, an operating system including various device drivers, and hardware devices (for example a graphics card) for interfacing with various peripheral devices. Such standard components are not shown in FIG. 1 for clarity.

The data store 6 in the embodiment of FIG. 1 includes a database that stores large number of different datasets, for example volumetric datasets representative of three dimensional CT data obtained from CT measurements on patients. In operation a selected dataset 7 is downloaded from the server to the processing apparatus for processing. The data store 6 in the embodiment of FIG. 1 is a server that stores a large quantity of patient data, and may form part of a Picture Archiving and Communication System (PACS). In other embodiments, the dataset 7 is stored in memory of the processing apparatus 2 rather then being downloaded from the server.

As mentioned above, the registration process comprises matching image data to an atlas. In the embodiment of FIG. 1 the atlas comprises a two-dimensional reference dataset that is the maximum intensity projection in the coronal direction of a three-dimensional volumetric dataset obtained from actual CT measurements on a reference patient or other human subject. The atlas also includes anatomical landmarks, which comprise for instance reference point data that identifies predetermined locations corresponding to anatomical features. In the embodiment of FIG. 1, the reference point data comprises a y-value representative of the distance along the transverse direction (along the length of the patient) at which the anatomical feature is located, and an identifier identifying the anatomical feature in question. In alternative embodiments, the reference point data can comprise two- or three-dimensional co-ordinates representative of the position of the anatomical feature in two or three dimensions.

In the embodiment of FIG. 1, the two-dimensional dataset of the atlas represents a whole-body measurement performed on the reference patient, and 16 different reference points are used. In alternative embodiments, the atlas can represent sub-portions of a body, for example only the torso region, and any suitable number of reference points can be provided.

Examples of anatomical features that have been used as landmarks include the following:—Skull Top, Orbitae, Skull Base, Lower Jaw, Neck, Humerus Heads, Lung Tops, Manubrium, Aortic Arch, Pulmonary Trunk, Liver Top, Liver Largest, Hili, Spleen Largest, Kidneys Largest, Iliac Wings, Ileosacral Joints, Femur Heads, Ischiatic Bones, Upper Legs, Patellae, Upper Fibula Tibia Joints, Lower Legs, Lower Fibula Tibia Joints, Ankle.

The reference points for the atlas are determined and stored in the atlas in advance, for example based upon the examination and identification by an operator of a displayed image obtained from the reference dataset. The MIP ensures that skeletal features are readily identifiable in the image, as maximum intensities in a CT dataset are usually obtained from bone matter. In the embodiment of FIG. 1, the reference points are points on the skeleton, which can be readily identified from the MIP. Use of skeletal features as reference points can be advantageous as the position, size and proportion of skeletal features vary less between patients or over time than other anatomical features, for example muscles or organs.

Figure 2:
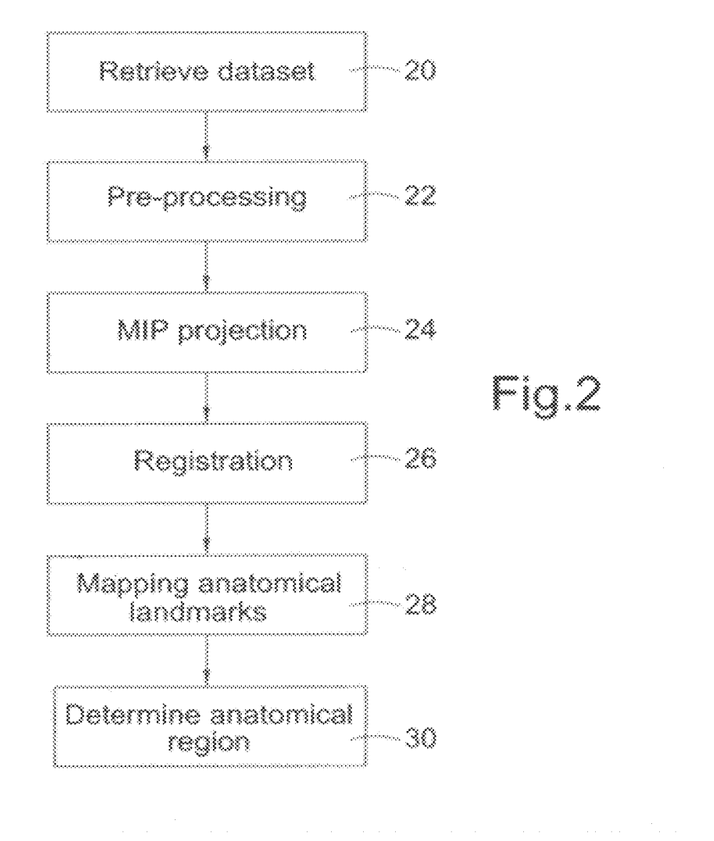
FIG. 2 is a flow chart illustrating, in overview, a method of identifying the location of anatomical features or regions according to one embodiment.

The registration process performed by the processing apparatus 2 in operation according to one mode of operation is now described, with reference to the flow chart of FIG. 2, which illustrates the process in overview.

At the first stage 20 of the method, the selected CT measurement dataset 7 is retrieved from the data store.

At the next stage 22, metadata associated with the measurement dataset 7 is read and stored for later use if necessary. The metadata may comprise, for example, a patient identifier and scaling information representative of the scaling of the data (for example, mm per pixel or voxel in each direction). Pre-processing of the data is also performed, for example, removing extraneous data.

At the next stage 24, a maximum intensity projection (MIP) of the measurement dataset is performed to produce a 2D coronal MIP of the measurement dataset.

The registration procedure 26 is then performed by the registration module 14. The registration module 14 firstly determines the scaling of the reference dataset of the atlas (mm per pixel in each direction) and adjusts the scaling of the measurement dataset MIP if necessary so that it has the same scaling as the reference dataset.

Next the registration module 14 performs an initial matching procedure, in which it searches for an offset between the position of the reference dataset and the position of the measurement dataset that provides an acceptable match between the image represented by the reference dataset and the image represented by the measurement dataset. The initial matching procedure comprises performing a number of fast searches with different start positions in only the y-direction (usually the transverse direction) to determine a vertical offset between the reference dataset and the measurement dataset that is close to the true one.

Any suitable search and matching procedure can be used, and may comprise any suitable optimisation technique or other technique for searching a solution space. In the embodiment of FIG. 2, Powell's method is used for the optimisation. Other optimisation methods that can be used include simulated annealing, the Broyden-Fletcher-Goldfarb-Shanno (BFGS) method, and the Simplex algorithm. The search and matching procedure usually comprises a comparison of pixel values for positions in the measurement dataset MIP with pixel values at corresponding positions in the reference dataset, for different offset positions between the measurement dataset MIP and the reference dataset.

The offset or transformation obtained in the initial matching procedure is then used as a starting point, and in the next stage a further more precise matching procedure is performed that comprises searching for a rigid transformation that provides the best registration of the 2D image represented by the measurement dataset MIP with the 2D image represented by the reference dataset. Again, any suitable optimisation technique or other technique for searching a solution space can be used. By using the offset or transformation obtained in the initial matching procedure as a starting point it can be ensured that the more precise matching procedure begins at a reasonable starting place, such that the search for the best rigid transformation does not get stuck at a local maxima or minima of the search space.

In the embodiment of FIG. 2, the rigid transformation is an affine transformation that transforms each of the x and y co-ordinates of the measurement MIP according to a separate linear transformation ($x=A_1 x+B_1$; $y=A_1 y+B_2$). In alternative embodiments, the transformation may only be in one of the x or y directions. In other alternative embodiments, a non-rigid transformation is used. In some such alternative embodiments, a rigid transformation is first obtained and used as the starting point for the search for the optimal non-rigid registration.

Figure 3:
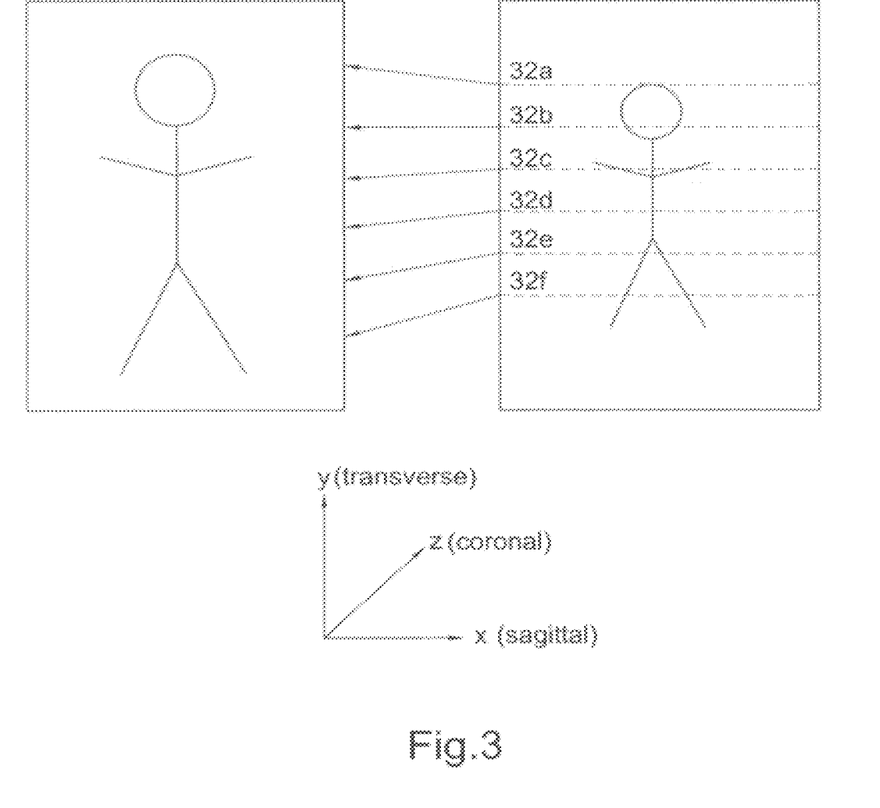
FIG. 3 is a schematic illustration showing the mapping of locations of anatomical landmarks of the reference dataset of an atlas to corresponding locations in an MIP of a measurement dataset.

At the next stage of the procedure 28, the location of each of the reference points, representing predefined anatomical landmarks, from the atlas is mapped to a corresponding location in the measurement MIP using the determined rigid transformation. That is illustrated schematically in FIG. 3, in which solid arrows are used to indicate a mapping of locations in the y-direction of anatomical landmarks $32a$-$32f$ of the reference dataset of the atlas 7 to corresponding locations in the y-direction of the measurement MIP.

Next, at stage 30, anatomical regions in the measurement MIP can be determined, if desired, based on the determined locations of the anatomical landmarks. The anatomical regions can be defined using appropriate anatomical landmarks as start-end points. For example, the collar bone and a particular vertebra could be used as anatomical landmarks and could also be used to delimit the torso region of a body. The torso region for the measurement MIP could then be determined as being the region between the location determined (using the rigid mapping from the atlas) for the collar bone and the particular verterbra. Alternatively, the start and end of particular anatomical regions can be derived from, but are not coincident with, the determined location of the anatomical landmarks. For example, a particular anatomical region could be defined as being midway between the locations of two selected anatomical landmarks.

In cases where a start position for a particular anatomical region is identified but no end point for the anatomical region is identified, and no further start or end points are identified before the end of the dataset, then the anatomical region in question can be taken as extending to the end of the dataset.

Either or both of the identified locations of the anatomical landmarks and the identified locations of the anatomical regions can be mapped back to corresponding locations in the CT measurement dataset and stored together with the CT measurement dataset, for example as metadata. In the embodiment of FIG. 2, as the atlas is based on a coronal MIP, anatomical locations or regions are specified in one or both of the coronal and transverse directions, but not in the sagittal direction.

The embodiment of FIG. 2 can provide for the automatic identification of anatomical features or regions in a CT dataset or other medical imaging dataset. For example, the method can automatically identify which anatomical regions (for example, torso, abdomen, head) are contained with the dataset and can automatically estimate the starting position and extent of each region. The embodiment of FIG. 2 is computationally simple, using image matching and known optimisation or other solution space searching techniques to determine a mapping between the measurement dataset and a reference dataset obtained from a real human subject. No slice-by-slice analysis of image content, or complex feature extraction, classification or training procedures are required by the embodiment of FIG. 2 to provide the automatic identification of anatomical regions or features, and the procedure is robust and can be executed rapidly.

In the mode of operation of the embodiment of FIG. 2 described above, a projection of volumetric measurement data is performed and the registration process comprises matching the projection of the measurement dataset to the reference dataset. In an alternative embodiment, the measurement dataset is a scout image dataset, also referred to as a scanogram dataset, obtained by performing X-ray projection measurements on the patient at a fixed angular position of the X-ray source. In that alternative embodiment, the scout image data is representative of a projection through the patient, and no data processing to obtain a projection of a volumetric measurement dataset is required. The registration process comprises matching the scout image data to the reference dataset. The reference dataset may comprise a projection of a volumetric dataset or may itself comprise a scout image dataset.

The embodiment of FIG. 2 can be used for a variety of applications. The identified anatomical regions can be used, for example, in selecting portions of the measurement dataset to be displayed to an operator or highlighted. For instance the identified anatomical regions can be used to automatically determine volume-of-interest (VOI) presets for three-dimensional volume rendered views of the measurement dataset. The presets can determine which parts of the data are to be displayed or highlighted, and can also automatically set, for example, colour, contrast, resolution, view angle, imaging tools or icons that are available to the user, and other display or analysis parameters in dependence on the particular anatomical region that is to be displayed.

Figure 4:
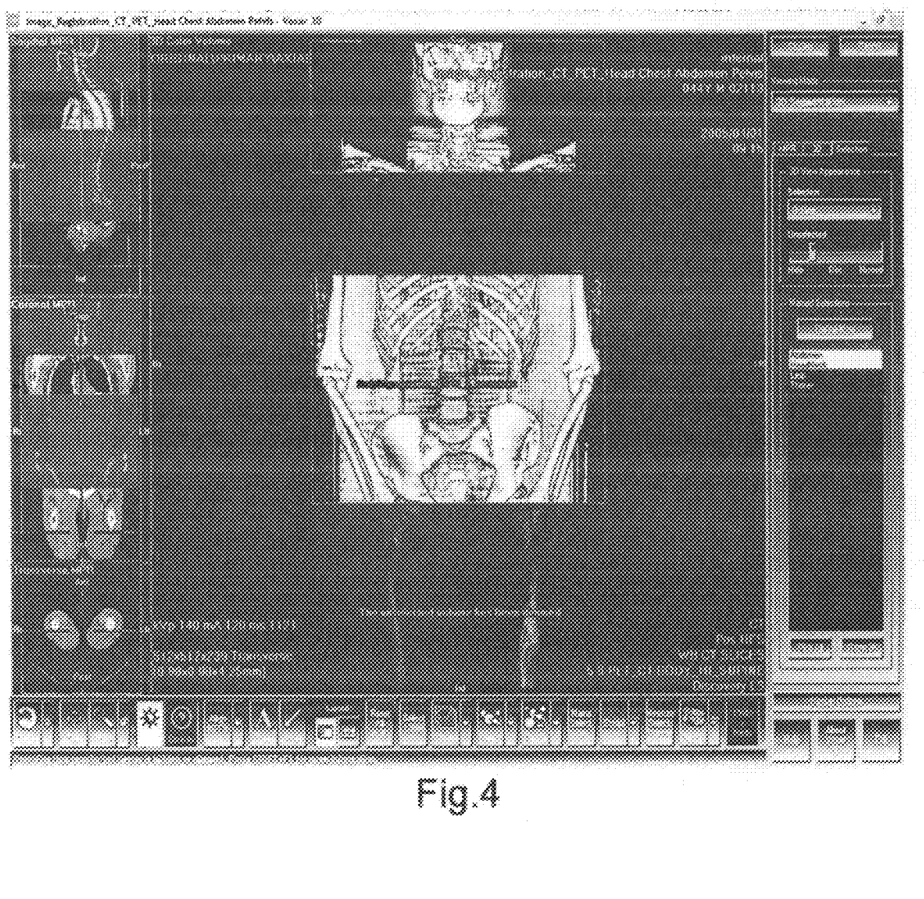
FIGS. 4 and 5 are volume rendered images of a CT dataset, with selected anatomical regions highlighted.
Figure 5:
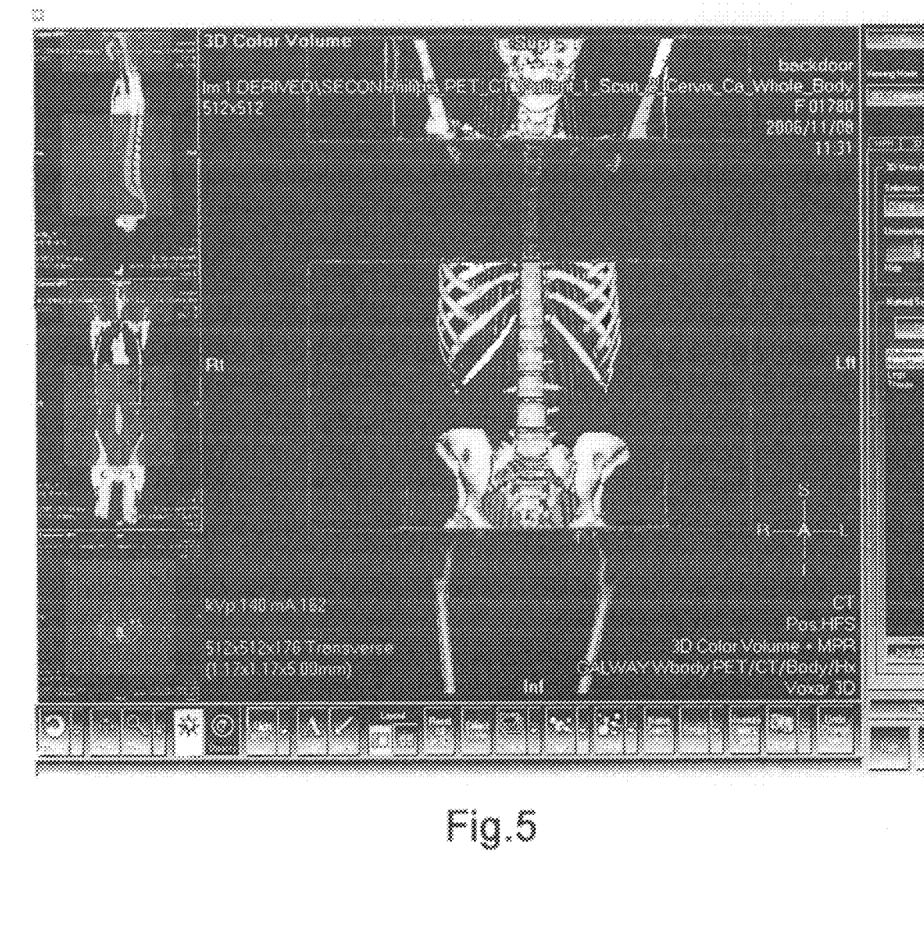

FIGS. 4 and 5 show volume rendered images of a CT dataset that has been subject to the procedure of the embodiment of FIG. 2 to automatically determine the location and extent of different anatomical regions in the CT dataset, and to store metadata representative of the determined location and extent of the anatomical regions.

In the case of FIG. 4, the operator has subsequently selected the display of the abdomen and head/neck regions. The abdomen and head/neck regions have been selected and displayed based on the metadata identifying the location and extent of those regions. Other, non-selected regions have been dimmed in the displayed image of FIG. 4 in order to display the selected anatomical regions. The rendering and display of the image and the display of the other views and icons can be performed in accordance with known medical imaging and volume rendering techniques, for instance using the Voxar 3D Workstation suite of products manufactured by Toshiba Medical Visualization Systems. However the settings to be used for the display of the images are determined automatically from the anatomical regions determined using the embodiment of FIG. 2.

FIG. 5 shows another example of an image of an anatomical region that has been selected and displayed based upon start and end points for the region determined automatically using the embodiment of FIG. 2. In the example of FIG. 5, the abdomen region has been selected and highlighted by automatically drawing a rectangular box around the region.

The described embodiments can also be used to automatically identify and locate anatomical regions or features as the starting point for further analysis or processing procedures. For example, information concerning anatomical regions or features obtained using the described embodiments can be used as an input to various subsequent procedures, for example:—

Automated bone segmentation procedures. Knowledge of the anatomical regions represented by a dataset can allow for the use of bone classifiers that are specialised for each region, which can provide improved results.

Automatic organ segmentation procedures. The information concerning anatomical regions can be used to provide hint points or start positions that can improve segmentation performance.

Automatic hanging protocols.

Automatic VOI presets for 3D VR views (for example, as described above).

Automatic study navigation. Knowledge of the position and extent of anatomical regions and features enables the provision of functionality that can automatically select or display data representative of a particular anatomical region or feature.

In another application, the described embodiments can be used to retrieve and process large numbers of medical image datasets in a data mining operation. For each dataset, anatomical regions or features represented by the dataset are automatically identified and data identifying the anatomical regions and/or the location of the regions is stored and associated with each dataset. That can enable subsequent retrieval and analysis of datasets from a collection of datasets based on anatomical region.

Figure 6:
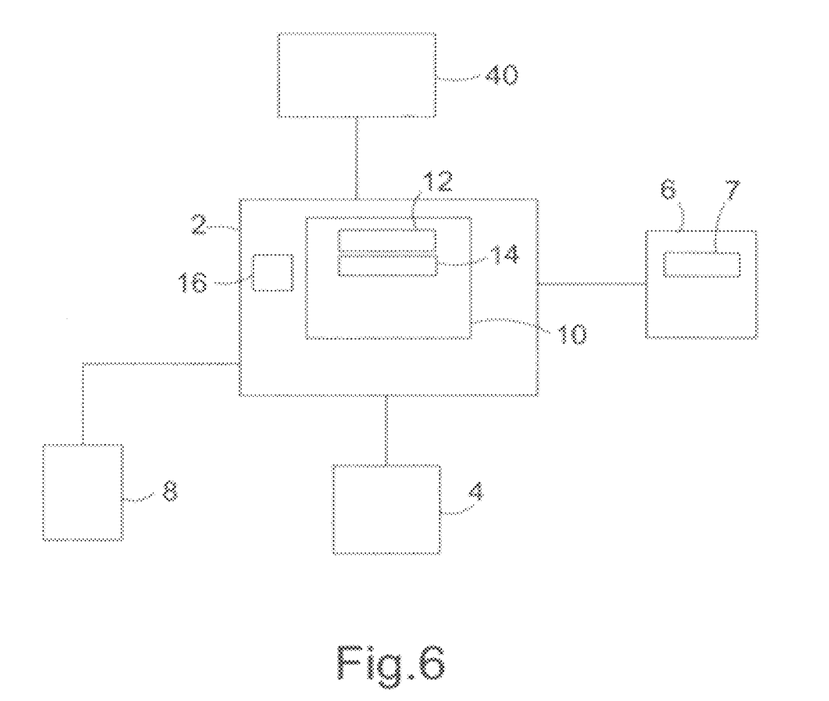
FIG. 6 is a schematic diagram showing an imaging apparatus according to a further embodiment.

In an alternative embodiment, the processing apparatus 2 is linked to a CT imaging apparatus 40, as illustrated schematically in FIG. 6 and is configured to receive and process CT image data from the CT imaging apparatus. The processing apparatus 2 in the alternative embodiment of FIG. 6 is configured to be used as a control terminal for controlling operation of the CT imaging apparatus.

In operation, a patient is installed in the CT imaging apparatus 40 in preparation for CT imaging measurements to be performed on the patient. The control terminal 2 is then configured to instruct the CT imaging apparatus 40 to perform a rapid whole-body scan of the patient from a single angle or a reduced set of angles. In contrast, in a normal, high resolution mode of operation measurements would usually be performed at a greater number of angles or orientation of the patient and the imaging apparatus.

The initial measurements are received and processed by the operator terminal 2 to produce a set of scout image data, also referred to as scanogram data. The scout image data are displayed to an operator on the display device 4 and the operator can examine the scout image to determine the approximate position and orientation of particular anatomical features for that particular patient. The operator can then set measurement parameters for subsequent, more detailed measurements using the CT imaging apparatus 40. For example, the operator can examine the scout image to determine a range of measurement positions for subsequent measurements on the patient to ensure that the measurements cover a particular anatomical feature of interest.

It is a feature of the embodiment of FIG. 6 that, as well as or instead of displaying the scout image data to the operator, the registration process illustrated in FIG. 2 is also applied to the scout image data to match the scout image data to atlas data and thus to identify the location of anatomical regions of the patient represented by the scout image data. The location of the anatomical regions of the patient relative to the imaging apparatus 40 obtained using the registration process of FIG. 2 can be used to automatically determine the range of measurement positions for subsequent, more detailed measurements using the imaging apparatus 40. Thus, the operator may not need to set the range of measurement positions manually following examination of the scout image by the operator. However, it is more usual to use the location of anatomical regions obtained from the automatic registration procedure as a back-up or check to ensure that measurement parameters set by an operator are not incorrect or hazardous.

For example, the operator terminal 2 can be configured to check that measurement parameters set by the operator to perform a more detailed measurement on a particular anatomical region or feature are consistent with the location of anatomical regions determined automatically using the registration procedure of FIG. 2. For example, if the operator enters data indicating that subsequent measurements are to be performed on a particular anatomical region or feature, for example the torso or lungs, but the location ranges entered by the operator for the measurement do not cover completely the indicated anatomical region or feature as determined using the automatic registration mapping, then the operator terminal 2 outputs a message to the operator indicating that the measurements may not cover the required anatomical region or feature. The operator can then either proceed with the measurements or reconsider the entered measurement parameters.

In another mode of operation, the operator terminal 2 is configured to monitor the intensity and location of measurements on the patient instructed by the operator. The operator terminal 2 determines automatically from the registration procedure of FIG. 2 the anatomical regions or features that are to be the subject of the measurement. If the measurement intensity exceeds a predetermined, safe limit for a particular anatomical region or feature then the operator terminal 2 automatically generates an alarm signal. The operator may then alter the measurement intensity or location.

The embodiment described in relation to FIG. 2 provides a rigid registration mapping to a reference dataset that is the two-dimensional MIP in the coronal direction obtained from a three-dimensional reference dataset. It has already been mentioned above that in alternative embodiments a non-rigid registration mapping can be used as well as or instead of the rigid mapping. In further alternative embodiments, further variations on the registration process are provided.

For example, in some alternative embodiments the atlas comprises both a coronal and a sagittal 2D MIP projection of the reference three dimensional dataset. There is still only one set of the anatomical landmarks in the atlas, each landmark having a position relative to the coronal and sagittal projections. Both a coronal and a sagittal MIP of the three-dimensional measurement dataset is performed. The coronal MIP of the measurement dataset is then mapped to the coronal MIP of the atlas, and the sagittal MIP of the measurement dataset is mapped to the sagittal MIP of the atlas. Each of those registration mappings can be performed independently, for example using a registration mapping process as described in relation to FIG. 2. The position of anatomical landmarks from the atlas can then be determined separately for each of the registration mappings. That can result in two different positions being obtained for each of the landmarks. The two positions obtained for each landmark can, for example, be averaged to obtain a single position for each landmark. Alternatively or additionally both sets of locations obtained for the landmarks can be processed in combination to determine the location of anatomical regions for the measurement dataset.

In other alternative embodiments multiple atlases are provided, each atlas comprising a reference dataset comprising measurements performed on a different subject. Each atlas dataset contains either a single projection or multiple projections (for example a coronal two-dimensional MIP, or both coronal and sagittal two-dimensional MIPs).

In such embodiments, an MIP or MIPs from a measurement dataset can be registered with corresponding MIPs (for example, coronal with coronal and sagittal with sagittal) for each of the atlases. Thus, different registration mappings for transferring locations of the anatomical landmarks to the measurement dataset are obtained from registration of the measurement dataset with each of the different atlases.

The transfer of the locations of the anatomical landmarks from the atlases to the new dataset can be performed by appropriate use of all the registration mappings, obtained from registration with each of the atlases. This leads to various sets of locations of the transferred landmarks from the various atlases which can be combined with each other in any of the following ways:—

- Averaging: averaging of resulting locations for each anatomical landmark and estimation of anatomical regions from those averaged locations.
- Median-based outlier rejection. Given enough results (a minimum of three transferred locations for each landmark), the median of each landmark's calculated location can be determined. Locations for a landmark determined using one of the registration mappings and for which the location differs from the median location by greater than a predetermined amount can be excluded. The remaining locations determined for each landmark are then averaged to determined a single location for each landmark.
- Overlap Predictors: Predictors are trained that can provide an indication of the likely quality of the registration between each of the atlases and the measurement dataset. The predictors can also be used to predict the amount of overlap each atlas dataset is likely to have with the measurement dataset (which of the atlas landmarks are expected to be present in the measurement dataset). These predictors can be used to pre-select the most appropriate set of atlases to be used in the registration procedure for a particular measurement dataset. The predictors can also be used in combining the landmark locations obtained for the measurement dataset using each of the selected atlases. For example, a weighted averaging of the determined locations for each of the landmarks can be used, with a greater weighting being given to those landmark locations obtained from registration with atlases that the predictors indicate should match better the measurement dataset in question.

In one example, the predictors could are used to select, or give greater weighting to, atlases that were obtained from subjects that were the same sex as, or a similar age to, the subject of the measurement dataset. For instance, atlases that were obtained from measurements on children would not usually be used to identify anatomical landmarks in a measurement dataset obtained from measurements on an adult subject, and vice versa.

In a further alternative embodiment, multiple registration procedures are applied to the same measurement dataset. In this method an MIP obtained from the whole measurement dataset is registered with an MIP obtained from the whole reference dataset of the atlas, to obtain locations of anatomical landmarks included in the atlas, as already described. A further registration procedure is then performed for each landmark, or a subset of the landmarks, individually. In the further registration procedure a portion of the measurement data for positions in a selected region around the identified position of the landmark is registered to reference data from a corresponding region of the reference dataset of the atlas. By performing the further registration procedure the accuracy of the identification of the location of anatomical landmarks in the measurement dataset can be improved in some cases.

The registration of MIPs of measurement datasets have been described. In alternative embodiments other projections, for example an average intensity projection or a cumulative intensity projection, are used instead of an MIP. In other alternative embodiments the measurement dataset itself represents a projection through the patient or other subject body, and may be a two-dimensional rather than volumetric dataset, for example a scout image dataset also referred to as a scanogram dataset.

The described embodiments can provide a robust and rapid determination of the position of anatomical regions without requiring feature extraction or classification, or organ segmentation (although such feature extraction or classification, or organ segmentation can also be performed if desired).

Although the described embodiments have been directed to the processing of CT imaging datasets, and other suitable imaging datasets may be used in alternative embodiments, for example magnetic resonance imaging datasets or volumetric (cone-beam) angiography datasets.

Whilst particular modules have been described herein, in alternative embodiments functionality of one or more of those modules can be provided by a single module, or functionality provided by a single module can be provided by two or more modules in combination.

It will also be well understood by persons of ordinary skill in the art that whilst embodiments implement certain functionality by means of software, that functionality could be implemented solely in hardware (for example by means of one or more ASICs (application specific integrated circuit)) or by a mix of hardware and software. As such, embodiments are not limited only to being implemented in software.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. A method of locating anatomical features in a medical imaging dataset comprising:
    obtaining a medical imaging measurement dataset that comprises image data for a subject body as a function of position; and
    performing a registration procedure that comprises:
        performing a search and matching procedure to obtain a registration mapping between positions in the measurement dataset and positions in a reference dataset, wherein the reference dataset comprises reference image data for a reference body as a function of position, the reference dataset comprises at least one anatomical landmark, and each anatomical landmark is indicative of the position of a respective anatomical feature of the reference body, wherein the search and matching procedure includes matching image data values in the measurement dataset with image data values for corresponding positions in the reference dataset, and wherein the search and matching procedure is performed independently of any feature extraction, classification, and segmentation of the measurement data set; and
    using the registration mapping to map the positions of the anatomical landmarks to positions in the measurement dataset, thereby to assign positions to anatomical features in the measurement dataset.

2. The method according to claim 1, further comprising determining positions of anatomical regions of the subject body from the determined positions of the anatomical features.

3. The method according to claim 1, wherein the registration mapping is a mapping for which a match between the image data of the measurement dataset and the reference image data of the reference dataset is optimized.

4. The method according to claim 1, wherein the image data of the measurement dataset comprises projection image data representative of a projection through the subject body.

5. The method according to claim 4, wherein the projection is a two dimensional projection in a coronal or sagittal direction.

6. The method according to claim 4, wherein the method further comprises obtaining volumetric image data and performing a projection of the volumetric image data to obtain the projection image data.

7. The method according to claim 6, wherein the projection comprises one of a maximum intensity projection (MIP); an average intensity projection; and a cumulative intensity projection.

8. The method according to claim 4, wherein the projection image data comprises scanogram data.

9. The method according to claim 4, wherein the method further comprises obtaining projection image data representative of a plurality of projections through the subject body, and performing the registration procedure for each of the plurality of projections.

10. The method according to claim 9, wherein the plurality of projections comprises a projection in the coronal direction and a projection in the sagittal direction.

11. The method according to claim 1, wherein the registration mapping comprises a transformation mapping, and the transformation mapping represents at least one of a rigid transformation; an affine transformation; and a non-rigid transformation.

12. The method according to claim 1, further comprising performing the registration procedure to determine positions of anatomical features in the measurement dataset, selecting data from the measurement dataset and the reference dataset for a range of positions around the positions of at least one of the anatomical features, and performing a further registration procedure using the selected data from the measurement dataset and the reference dataset.

13. The method according to claim 1, further comprising providing a plurality of reference datasets each comprising reference image data for a respective, different reference body as a function of position, and each comprising a plurality of anatomical landmarks.

14. The method according to claim 13, further comprising performing a plurality of registration procedures, each registration procedure using the measurement dataset and a respective different one of the reference datasets.

15. The method according to claim 14, further comprising determining similarities between at least one property of the subject body and at least one property of each of the reference bodies.

16. The method according to claim 15, further comprising using the determined similarities to select from the plurality of reference datasets, reference datasets to be used in the registration procedures.

17. The method according to claim 14, wherein each of the plurality of registration procedures determines different locations for the anatomical features, and the method further comprises combining the determined locations to provide a single determined location for each anatomical feature or region.

18. The method according to claim 17, wherein the combining of the determined locations to provide a single determined location for each anatomical feature or region comprises providing different weightings to the determined locations obtained using different reference datasets, and the different weightings are determined in dependence on determined similarities between the at least one property of the subject body and the at least one property of the reference bodies.

19. The method according to claim 1, wherein the varying of the mapping comprises searching for an optimum mapping using an optimization procedure.

20. The method according to claim 1, wherein each of the plurality of anatomical landmarks is indicative of the position of a respective feature of the skeleton of the reference body.

21. The method according to claim 1 wherein the reference dataset comprises reference image data obtained by medical imaging measurements performed on a reference body.

22. The method according to claim 1, wherein each of the subject body and the reference body is at least part of a human body.

23. The method according to claim 1, wherein the measurement dataset comprises scout image data, and the method further comprises setting measurement parameters for subsequent measurements on the subject body in dependence on the positions of the anatomical features determined using the registration procedure performed on the scout image data.

24. The method according to claim 1, wherein the measurement dataset comprises scout image data, and the method further comprises monitoring measurement parameters selected for subsequent measurements on the subject body and generating an output signal if the measurement parameters are inconsistent with the positions of the anatomical features determined using the registration procedure performed on the scout image data.

25. The method according to claim 24, wherein the method further comprises determining whether the measurement parameters selected for subsequent measurements on the subject body represent the application of radiation having an intensity greater than a predetermined threshold for positions of anatomical features or regions determined using the registration procedure performed on the scout image data, and generating an alarm signal if the intensity is greater than the predetermined threshold.

26. A system for locating anatomical features in a medical imaging dataset comprising:
a data store for storing a medical imaging measurement dataset that comprises image data for a subject body as a function of position; and
a processing resource comprising a registration module that is configured to perform a registration procedure that comprises:
performing a search and matching procedure to obtain a registration mapping between positions in the measurement dataset and positions in a reference dataset, wherein the reference dataset comprises reference image data for a reference body as a function of position, the reference dataset comprises at least one anatomical landmark, and each anatomical landmark is indicative of the position of a respective anatomical feature of the reference body, wherein the search and matching procedure includes matching image data values in the measurement dataset with image data values for corresponding positions in the reference dataset, and wherein the search and matching procedure is performed independently of any feature extraction, classification, and segmentation of the measurement data set;
and
using the registration mapping to map the positions of the anatomical landmarks to positions in the measurement dataset, thereby to assign positions to anatomical features in the measurement dataset.

27. The system according to claim 26, wherein the processing resource is configured to determine positions of anatomical regions of the subject body from the determined positions of the anatomical features.

28. The system according to claim 26, wherein the image data of the measurement image dataset comprises projection image data representative of a projection through the subject body.

29. The system according to claim 26, wherein the processing resource is configured to perform a projection of volumetric image data to obtain the projection image data.

30. The system according to claim 28, wherein the projection is a two dimensional maximum intensity projection.

31. The system according to claim 28, wherein the projection image data comprises scanogram data.

32. The system according to claim 28, wherein the processing resource is configured to perform the registration procedure for each of a plurality of sets of projection image data, each representative of a different projection through the subject body.

33. A system according to claim 26, wherein the registration mapping comprises a transformation mapping representing a rigid transformation.

34. The system according to claim 26, wherein the measurement dataset comprises scout image data, and the processing resource is configured to set measurement parameters for subsequent measurements on the subject body in dependence on the positions of the anatomical features determined using the registration procedure performed on the scout image data.

35. The system according to claim 26, wherein the measurement dataset comprises scout image data, and the processing resource is configured to monitor measurement parameters selected for subsequent measurements on the subject body and generating an output signal if the measurement parameters are inconsistent with the positions of the anatomical features determined using the registration procedure performed on the scout image data.

36. The system according to claim 35, wherein the processing resource is configured to determine whether the measurement parameters selected for subsequent measurements on the subject body represent the application of radiation having an intensity greater than a predetermined threshold for positions of anatomical features or regions determined using the registration procedure performed on the scout image data, and generating an alarm signal if the intensity is greater than the predetermined threshold.

37. A non-transitory computer readable medium comprising computer readable instructions that are executable by a computer to cause the computer to:
obtain a medical imaging measurement dataset that comprises image data for a subject body as a function of position; and
perform a registration procedure that comprises:
performing a search and mapping procedure to obtain a registration mapping between positions in the measurement dataset and positions in a reference dataset, wherein the reference dataset comprises reference image data for a reference body as a function of position, the reference dataset comprises at least one anatomical landmark, and each anatomical landmark is indicative of the position of a respective anatomical feature of the reference body, wherein the search and matching procedure includes matching image data values in the measurement dataset with image data values for corresponding positions in the reference dataset, and wherein the search and matching procedure is performed independently of any feature extraction, classification, and segmentation of the measurement data set;
and
use the registration mapping to map the positions of the anatomical landmarks to positions in the measurement dataset, thereby to assign positions to anatomical features in the measurement dataset.

38. The method according to claim 1, wherein the image data of the measurement dataset comprises projection image data representative of a projection through the subject body, and wherein the method further comprises:
obtaining volumetric image data and performing a projection of the volumetric image data to obtain the projection image data; and
mapping the assigned positions of anatomical features in the measurement dataset back to corresponding positions in the volumetric image data.

\* \* \* \* \*